3,506,665
4-4'-(ETHYLENEDIIMINO) BIS[2 - PHENYLPYRIMIDINE - 5 - CARBOXYLIC ACID]DIALKYL ESTERS AND RELATED COMPOUNDS

Dong H. Kim, Wayne, and Arthur A. Santilli, Havertown, Pa., assignors to American Home Products Corporation, New York, N.Y., a corporation of Delaware
No Drawing. Filed Mar. 8, 1968, Ser. No. 711,523
Int. Cl. C07d 51/42
U.S. Cl. 260—256.4      10 Claims

ABSTRACT OF THE DISCLOSURE

This present invention relates to 4,4'-(ethylenediimino)bis[2-phenylpyrimidine-5-carboxylic acid]dialkyl esters; 4,4'-(o-phenylenediimino)bis[2 - phenylpyrimidine-5-carboxylic acid]dialkyl esters; and 4,4'-(1,4-piperazinediyl)bis[2-phenyl-5-pyrimidinecarboxylic acid]dialkyl esters which are pharmacologically active as mydriatic agents.

---

This invention concerns new and novel bis[2-phenylpyrimidine-5-carboxylic acid]dialkyl esters. In particular the present invention is concerned with 4,4'-(ethylenediimino)bis[2-phenylpyrimidine-5-carboxylic acid]dialkyl esters; 4,4'-(o-phenylenediimino)bis[2-phenylpyrimidine-5-carboxylic acid]dialkyl esters; and 4,4'-(1,4-piperazinediyl)bis[2-phenyl-5-pyrimidinecarboxylic acid]dialkyl esters which have demonstrated mydriatic properties when tested under standard and accepted pharmacological procedures.

The new and novel compounds within the purview of the present invention are exemplified by those having the following formula:

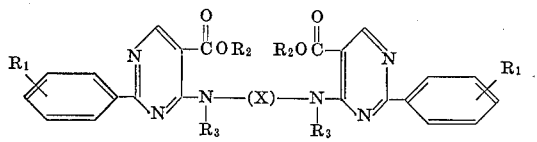

wherein both $R_1$'s are the same and are selected from the group consisting of hydrogen, halogen, lower alkyl and lower alkoxy; both $R_2$'s are the same and are lower alkyl; both $R_3$'s when taken separately are the same and are selected from the group consisting of hydrogen and lower alkyl; X when taken separately is selected from the group consisting of ethylene and phenylene with the proviso that when X is phenylene both $R_3$'s are hydrogen; and when X and both $R_3$'s are taken together with the nitrogen atoms to which they are attached they form a piperazinediyl ring. As employed herein the terms "lower alkyl" and "lower alkoxy" are meant to include both branched and straight moieties having from one to about eight carbon atoms. Typical examples thereof are: 4,4'-(1,4 - piperazinediyl)bis[phenyl-5-pyrimidinecarboxylic acid] diethyl ester; 4,4'-(N,N'-diethylethylenediimino)bis[2-phenylpyrimidine-5-carboxylic acid]diethyl ester; 4,4'-(N,N' - dimethylethylenediimino)bis[2 - phenylpyrimidine-5-carboxylic acid]diethyl ester; 4,4'-(ethylenediimino)bis[2-phenylpyrimidine-5-carboxylic acid]diethyl ester; and 4,4'-(o-phenylenediimino)bis[2-phenylpyrimidine-5-carboxylic acid]diethyl ester.

The new and novel compounds of the present invention are prepared by the process which is depicted by following reaction scheme:

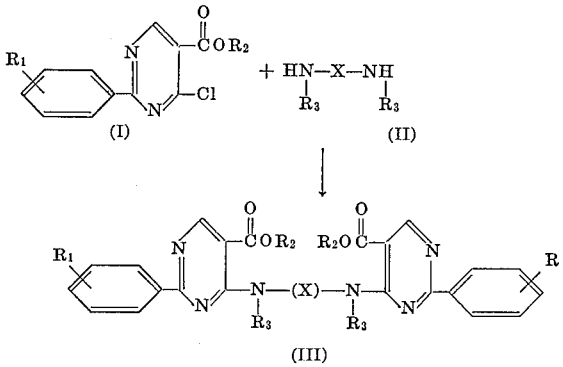

wherein $R_1$, $R_2$, $R_3$ and X are defined as above. The above reaction is effected by contacting at least two molar equivalents of a 4-chloro-5-carb(lower)alkoxy-2-phenylpyrimidine (I) with an appropriate diamine (II), in the presence of a weak base, in a reaction-inert organic solvent at a temperature range from about 80° C. to about 150° C. for a period of about one to about ten hours. Preferably this reaction is conducted in the presence of soduim carbonate at the reflux temperature of the reaction mixture.

When the above reaction is complete, the resulting product (III) is separated by standard recovery procedure, e.g. the reaction mixture is poured into cold water, the resulting precipitate separated by filtration and then recrystallized from a suitable solvent, such as, an alkanol, cyclohexane and mixtures thereof. As employed herein, the term "weak base" is meant to include such compounds as alkali metal carbonates, alkali metal bicarbonates and pyridine, while many others will readily suggest themselves to one skilled in the art of chemistry. The term "reaction-inert organic solvent" is defined as an organic solvent which will readily dissolve the reactants but not interfere with their interaction, such as, dimethylformamide, dimethylacetamide, dioxane, alkanols and the like. The starting materials, both the 4-chloro-5-carb(lower)alkoxy-2-phenylpyrimidines (I) and the diamines (II), employed in the above process are commercially available or are readily prepared by procedures well known in the art.

The new and novel compound of the present invention possess valuable pharmacological activity. In particular, these compounds in standard pharmacological procedures demonstrate mydriatic activity and are useful as mydriatic agents.

In the pharmacological evaluation of the mydriatic agents of this invention the in vivo effects of the compounds of this invention are tested as follows:

The compound is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and automatic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate method" [Nathan B. Eddy and Dorothy Leimbach, J. Pharmacol. Exper. Therap. 107, 385 1953)] is used to test for analgesia. The experiment is terminated by subjecting each animal to a maximal electroshock to test for anticonvulsant activity.

The compounds of this invention in the above test procedure induced mydriasis at 400 mg./kg. There were no deaths in the test animals at the highest dose used, 400 mg./kg., intraperitoneally.

When the compounds of this invention are employed as mydriatic agents in warm-blooded animals, e.g. mice, rats, rabbits, guinea pigs, cats, dogs and monkeys they may be administered alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the compounds of the present invention will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

A mixture of 5.24 g. of 4-chloro-5-carbethoxy-2-phenylpyrimidine, 0.86 g. of piperazine, 2.65 g. of sodium carbonate, and 30 ml. of N,N-dimethylformamide are heated at reflux for one hour. The reaction mixture is then poured into about 700 ml. of cold water, and the resulting precipitate is separated by filtration. Recrystallization from ethanol affords 2.1 g. of 4,4′-(1,4-piperazinediyl)bis[2 - phenyl - 5 - pyrimidinecarboxylic acid]diethyl ester, M.P. 163–166° C.

*Analysis.*—Calcd. for $C_{30}H_{30}N_6O_4$ (percent): C, 66.90; H, 5.61; N, 15.61. Found (percent): C, 66.87; H, 5.78; N, 15.57.

In a similar manner, reacting the hereinafter listed 4-chloro-5-carbalkoxy-2-phenylpyrimidines with piperazine, the following products are prepared:

| Reactants | Products |
| --- | --- |
| 4-chloro-5-carbomethoxy-2-(p-chlorophenyl)pyrimidine and piperazine. | 4,4′-(1,4-piperazinediyl)bis[2-(p-chlorophenyl)-5-pyrimidinecarboxylic acid]dimethyl ester. |
| 4-chloro-5-carbethoxy-2-(p-tolyl)pyrimidine and piperazine. | 4,4′-(1,4-piperazinediyl)bis[2-(p-tolyl)-5-pyrimidinecarboxylic acid]diethyl ester. |
| 4-chloro-5-carbethoxy-2-(m-methoxyphenyl)pyrimidine and piperazine. | 4,4′-(1,4-piperazinediyl)bis[2-(m-methoxyphenyl)-5-pyrimidinecarboxylic acid]diethyl ester. |

EXAMPLE II

A mixture of 3.0 g. of 4-chloro-5-carbethoxy-2-phenylpyrimidine, and 1.4 g. of N,N′-diethylethylenediamine are reacted as described in Example I to afford 4,4′-(N,N′-diethylethylenediimino)bis[2 - phenylpyrimidine - 5 - carboxylic acid]diethyl ester which is recrystallized from cyclohexane, M.P. 155.5–158° C.

*Analysis.*—Calcd. for $C_{32}H_{36}N_6O_4$ (percent): C, 67.58; H, 6.38; N, 14.78. Found (percent): C, 67.74; H, 6.60; N, 14.50.

Similarly, 4,4′ - (N,N′-dimethylethylenediimino)bis[2-phenylpyrimidine-5-carboxylic acid]diethyl ester is prepared as in Example I from 4-chloro-5-carbethoxy-2-phenylpyrimidine and N,N′-dimethylethylenediamine. The crude product is recrystallized from ethanol-cyclohexane, and then ethanol-water, M.P. 157.5–159.5° C.

*Analysis.*—Calcd. for $C_{30}H_{32}N_6O_4$ (percent): C, 66.65; H, 5.97; N, 15.55. Found (percent): C, 66.75; H, 5.91; N, 15.71.

In a similar manner, the following compounds are prepared:

4,4′ - (N,N′ - dipropylethylenediimino)bis[2 - (p-bromophenyl)pyrimidine-5-carboxylic acid]dimethyl ester;
4,4′ - (N,N′ - diethylethylenediimino)bis[2 - (p-ethylphenyl)pyrimidine-5-carboxylic acid]dipropyl ester; and
4,4′ - (N,N′ - dibutylethylenediimino)bis[2 - phenylpyrimidine-5-carboxylic acid]diethyl ester.

EXAMPLE III

A solution of 0.6 g. of ethylene diamine and 2.6 g. of 4-chloro-5-carbethoxy - 2 - phenylpyrimidine in 15 ml. of pyridine is heated under reflux for five hours and poured into 200 ml. of water. A precipitate is obtained which is recrystallized from ethanol affording 0.5 g. of 4,4′-(ethylenediimino)bis[2 - phenylpyrimidine-5-carboxylic acid]diethyl ester, M.P. 169–172° C.

*Analysis.*—Calc'd for $C_{28}H_{28}N_6O_4$ (percent): C, 65.61; H, 5.51; N, 16.40. Found (percent): C, 65.83; H, 5.37; N, 16.08.

In like manner, the following compounds are prepared:

4,4′-(ethylenediimino)bis[2-(p-chlorophenyl)pyrimidine-5-carboxylic acid]dimethyl ester;
4,4′-(ethylenediimino)bis[2-(p-fluorophenyl)pyrimidine-5-carboxylic acid]dibutyl ester;
4,4′-(ethylenediimino)bis[2-(p-ethoxyphenyl)pyrimidine-5-carboxylic acid]diethyl ester;
4,4′-(ethylenediimino)bis[2-(m-iodophenyl)pyrimidine-5-carboxylic acid]dimethyl ester; and
4,4′-(ethylenediimino)bis[2-(p-butylphenyl)pyrimidine-5-carboxylic acid]diethyl ester.

EXAMPLE IV

A mixture of 1.1 g. of o-phenylenediamine 2.6 g. of 4-chloro-5-carbethoxy-2-phenylpyrimidine 2.5 g. of potassium bicarbonate in 50 ml. of ethanol is heated under reflux for six and a half hours. After allowing the reaction mixture to cool in ice, there is obtained 1.6 g. of product. Recrystallization from ethanol gave 0.6 g. of 4,4-(o-phenylenediimino)bis[2 - phenylpyrimidine-5-carboxylic acid]diethyl ester, M.P. 178–179.5° C.

*Analysis.*—Calc'd for $C_{32}H_{28}N_6O_4$ (percent): C, 68.56; H, 5.03; N, 14.99. Found (percent): C, 68.28; H, 5.05; N, 15.14.

Similarly, the following compounds are synthesized:

4,4′-(o-phenylenediimino)bis[2-(p-chlorophenyl)pyrimidine-5-carboxylic acid]dimethyl ester;
4,4′-(o-phenylenediimino)bis[2-(p-tolyl)pyrimidine-5-carboxylic acid]diethyl ester; and
4,4′-(o-phenylenediimino)bis[2-(p-ethoxyphenyl)pyrimidine-5-carboxylic acid]dipropyl ester.

What is claimed is:

1. A compound selected from the group consisting of those having the formula:

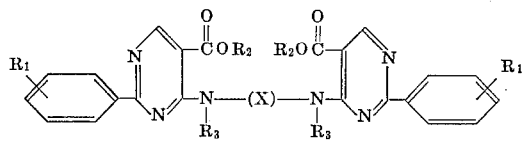

wherein both $R_1$'s are the same and are selected from the group consisting of hydrogen, halogen, lower alkyl and lower alkoxy; both $R_2$'s are the same and are lower alkyl; both $R_3$'s when taken separately are the same and are selected from the group consisting of hydrogen and lower alkyl; X when taken separately is selected from the group consisting of ethylene and phenylene with the proviso that when X is phenylene both $R_3$'s are hydrogen; and when X and both $R_3$'s are taken together with the nitrogen atoms to which they are attached they form a piperazinediyl ring.

2. A compound as described in claim 1 which is: 4,4'-(1,4 - piperazinediyl)bis[2-phenyl-5-pyrimidinecarboxylic acid]diethyl ester.

3. A compound as described in claim 1 which is: 4,4'-(N,N' - diethylethylenediimino)bis[2-phenylpyrimidine-5-carboxylic acid]diethyl ester.

4. A compound as described in claim 1 which is: 4,4'-(N,N' - dimethylethylenediimino)bis[2-phenylpyrimidine-5-carboxylic acid]diethyl ester.

5. A compound as described in claim 1 which is: 4,4'-(ethylenediimino)bis[2-phenylpyrimidine - 5 - carboxylic acid]diethyl ester.

6. A compound as described in claim 1 which is: 4,4'-(o-phenylenediimino)bis[2 - phenylpyrimidine-5-carboxylic acid]diethyl ester.

7. A compound as described in claim 1 which is: 4,4'-(1,4 - piperazinediyl)bis[2-(p-chlorophenyl) - 5 - pyrimidinecarboxylic acid]dimethyl ester.

8. A compound as described in claim 1 which is: 4,4'-(N,N' - dipropylethylenediimino)bis[2-(p-bromophenyl)pyrimidine-5-carboxylic acid]dimethyl ester.

9. A compound as described in claim 1 which is: 4,4'-(ethylenediimino)bis[2 - (p - chlorophenyl)pyrimidine-5-carboxylic acid]dimethyl ester.

10. A compound as described in claim 1 which is: 4,4'-(o-phenylenediimino)bis[2 - (p-chlorophenylpyrimidine)-5-carboxylic acid]dimethyl ester.

References Cited

UNITED STATES PATENTS 2,671,788  3/1954  Jacob et al. _____ 260—256.4

ALEX MAZEL, Primary Examiner
R. J. GALLAGHER, Assistant Examiner

U.S. Cl. X.R.
260—256.4; 424—251